Sept. 14, 1926.

A. C. FINNEY

PROTECTIVE SYSTEM

Filed Dec. 1, 1920

1,600,041

2 Sheets-Sheet 1

Inventor:
Alfred C. Finney,
by his Attorney.

Sept. 14, 1926.

A. C. FINNEY 1,600,041

PROTECTIVE SYSTEM

Filed Dec. 1, 1920

2 Sheets-Sheet 2

Inventor:
Alfred C. Finney,
by *Albert G. Davis*
His Attorney.

Patented Sept. 14, 1926.

1,600,041

UNITED STATES PATENT OFFICE.

ALFRED C. FINNEY, OF SCHENECTADY, NEW YORK, ASSIGNOR TO GENERAL ELECTRIC COMPANY, A CORPORATION OF NEW YORK.

PROTECTIVE SYSTEM.

Application filed December 1, 1920. Serial No. 427,540.

My invention relates to protective systems and has as an object to provide for controlling the operation of a circuit breaker arranged to interrupt a supply circuit to which electrical apparatus is adapted to be connected in different ways each of which changes the load capacity of the apparatus.

Another object of my invention is to provide a simple and efficient arrangement of protective apparatus which may be readily and independently adjusted for any desired load for each of a plurality of connections and which, when adjusted, will interrupt the circuit at the predetermined load without skill or forethought on the part of the operator of the apparatus.

My invention will be better understood from the following description taken in connection with the accompanying two sheets of drawings, and its scope will be pointed out in the appended claims.

Figure 1:
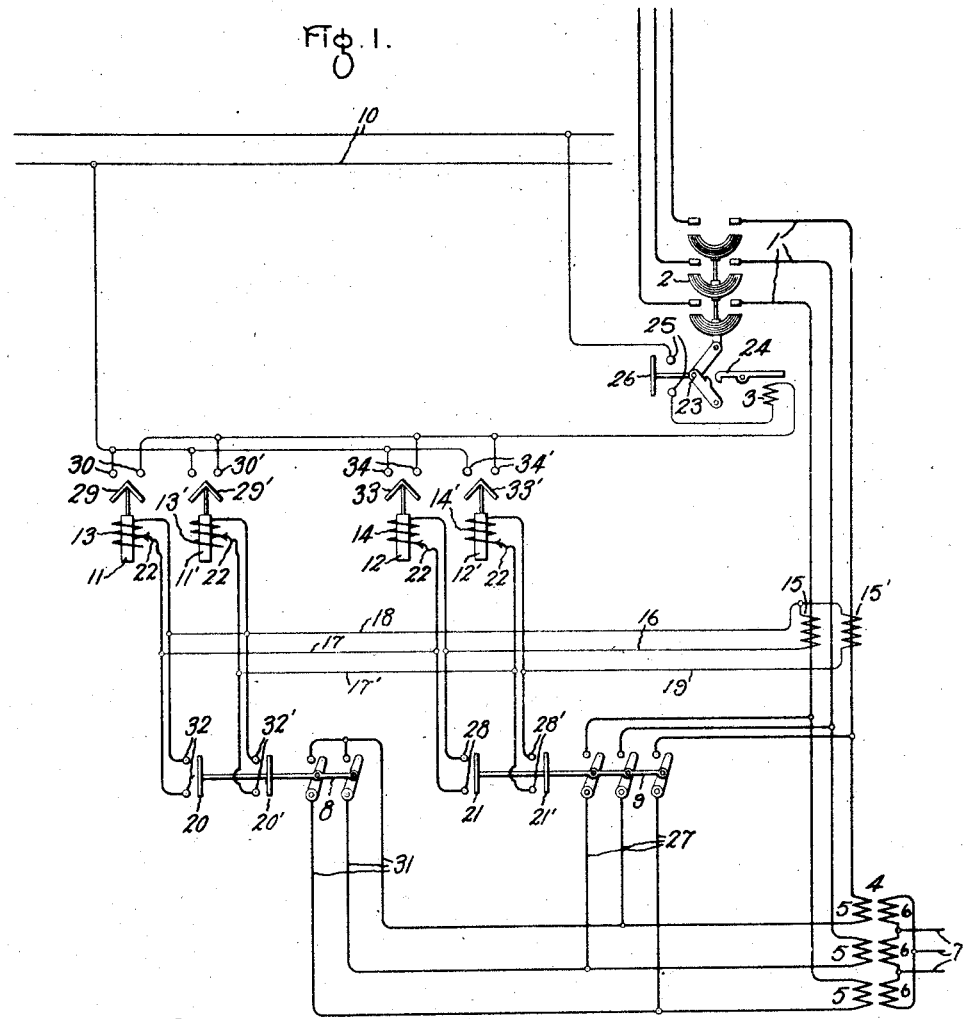
Figure 2:
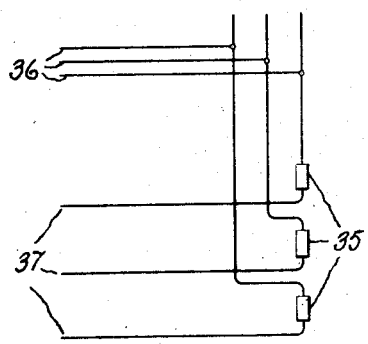
Figure 3:
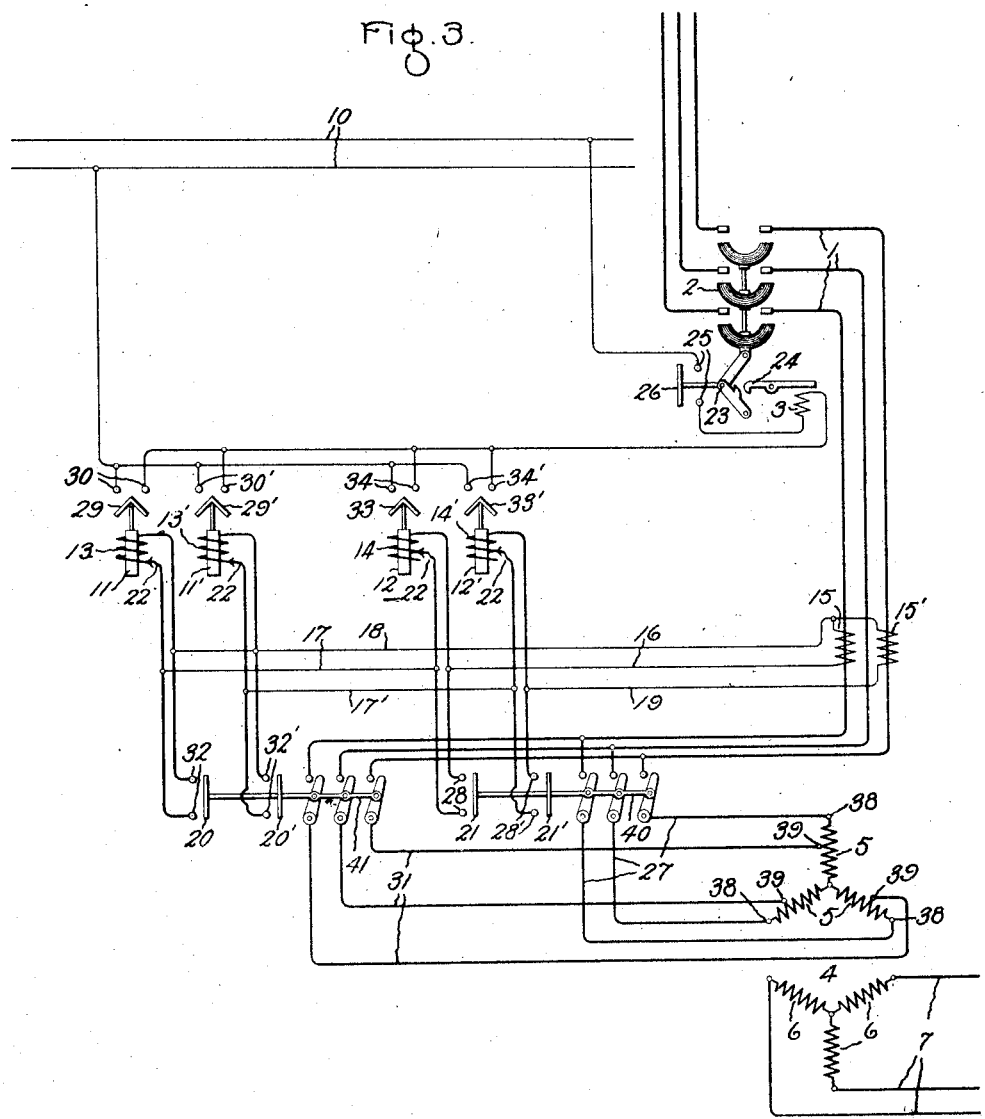

Fig. 1 is a diagram of a system embodying my invention; Fig. 2 is a fragmentary diagram of a system to which my invention is applicable, and Fig. 3 is a diagram of another system embodying my invention.

In Fig. 1 my invention is shown, by way of illustration, as applied to a three-phase supply circuit 1 controlled by an automatic circuit breaker 2 having a trip coil 3. The circuit breaker 2 will preferably be an oil circuit breaker, although the specific type of circuit breaker is immaterial as far as my invention is concerned. In Fig. 1 the load apparatus is shown as a power transformer 4 having primary windings 5 and secondary windings 6. The secondary windings 6 of the power transformer 4 are shown delta connected to a load circuit 7 the load on which may be, for instance, an electric furnace, and the primary windings 5 are adapted to be star connected to the supply circuit 1 by a double pole switch 8 or delta connected by a triple pole switch 9. With switch 8 closed or primary star connected the power transformer 4 operates at a lower KV—A or load capacity than with switch 9 closed or primary delta connected. That is to say, the transformer carries greater load with both primary and secondary delta connected than with primary star connected and secondary delta connected. Obviously, the switches 8 and 9 may be interlocked so that only one can be closed at a time.

In order to protect the power transformer under the various KV—A or load capacities established by the different connections, the circuit breaker trip coil 3 is placed in a normally open circuit supplied from a suitable source of power 10 and arranged to be completed by relays 11, 11', 12 and 12' selectively responsive to loads in excess of predetermined capacities. Upon the closing of the trip coil circuit, the trip coil 3 is energized and the circuit breaker 2 thereby automatically opened.

The actuating windings 13, 13', 14 and 14' of the relays 11, 11', 12 and 12' and the secondaries of the current transformers 15 and 15' are connected in series by conductors 16, 17, 17', 18 and 19. Bridging members 20, 20', 21, 21' interlocked to the switches 8 and 9 operate to shunt certain of the relay windings 13, 13', 14, 14' while the others remain in circuit with the secondaries of the current transformers 15, 15' upon the closing of either of the switches 8 or 9. To change the setting of the relays, they are preferably provided with an adjustment 22 herein illustrated as varying the number of turns in the windings 13, 13', 14 and 14'. Irrespective of the means used to vary the sensitivity of the relays 11, 11', 12 and 12', it is obvious that they may be independently adjusted to respond to any load in excess of a predetermined amount for any one of a plurality of different connections and the arrangement of my apparatus is such that one or more relays of the proper sensitivity are selectively placed in circuit with the secondaries of the current transformers 15, 15' to respond to loads in excess of the predetermined capacities established by such connections.

My apparatus, as shown in Fig. 1, operates to protect the power transformer 4 with primary delta connected as follows: The circuit breaker 2 is closed by the toggle 23 which is held in circuit breaker closed position by latch 24 arranged to be released by the action of the trip coil 3. At the same time the contacts 25 in the trip coil circuit are bridged by the member 26 interlocked with the toggle 23. The switch 9 is now closed to complete the circuit of conductors 1, 27 and the primary windings 5 of the power transformer 4 for delta connection or operation of the power transformer 4 at full KV—A or load capacity. Simultaneously, with the closing of switch 9, the members 21, 21′ interlocked thereto, bridge the contacts 28, 28′ to short circuit the relay windings 14, 14′ and current flow in the relay windings 13, 13′ and the secondaries of the current transformers 15, 15′ is established. The path of the current for actuating the relay 11 is the secondary of current transformer 15, the conductor 16, the bridging member 21, the conductor 17, the winding 13 of relay 11 and the conductor 18, and for the relay 11′ the current path is the secondary of current transformer 15′, the conductor 19, the bridging member 21′, the conductor 17′, the winding 13′ of the relay 11′ and the conductor 18. Upon the occurrence on the system of a load in excess of a predetermined capacity for which the relays 11, 11′ are set, one or both of the relay windings 13, 13′ will be energized, thus actuating the members 29, 29′ to bridge the contacts 30 and 30′, thereby completing the circuit of the trip coil 3. The trip coil 3 energized by the source of power 10 will trip the latch 24 to release the toggle 23 and open the circuit breaker 2. At the same time bridging member 26 will break the trip coil circuit preliminary to the release of the bridging members 29 and 29′ upon the de-energizing of the relay windings through the opening of the supply circuit thus protecting the more delicate relay contacts 30, 30′ from arcing effects.

My apparatus, as shown in Fig. 1, operates to protect the power transformer with the primary star-connected as follows: The circuit breaker 2 is closed as heretofore described. The switch 8 is then closed to complete the circuit of the conductors 1 and 31 and the primary windings 5 of the power transformer 4 for star-connection or operation of the power transformer 4 at reduced KV—A or load capacity. Simultaneously, with the closing of the switch 8, the members 20, 20′ interlocked thereto, bridge the contacts 32, 32′ to short circuit the relay windings 13, 13′ and current flow in the relay windings 14, 14′ and the secondaries of the current transformers 15, 15′ is established. The path of the current for actuating relay 12 is the secondary of current transformer 15, the conductor 16, the winding 14 of the relay 12, the conductor 17, the bridging member 20, and the conductor 18, and for the relay 14′, the current path is the secondary of the current transformer 15′, the conductor 19, the winding 14′ of relay 12′, the conductor 17′, the bridging member 21′, and the conductor 18. Upon the occurrence on the system of a load in excess of a predetermined amount for which the relays 12, 12′ are set, one or both of the relay windings 14, 14′ will be energized, thus actuating the members 33, 33′ to bridge the contacts 34, 34′ thereby completing the circuit of the trip coil 3. The trip coil 3, energized by the source of power 10 will trip the latch 24 to release the toggle 23 and open the circuit breaker 2.

In its broadest aspect my invention is obviously applicable to control load apparatus arranged to operate at different load capacities, and while in Fig. 1 I have shown an embodiment of my invention as used to protect a transforming apparatus arranged to operate at different load capacities, it is obvious that my invention may also be used to protect a translating apparatus, arranged to operate at different load capacities, such as shown diagrammatically in Fig. 2.

In Fig. 2, translating devices 35, which may be heaters, are shown in a three-phase supply circuit. The translating devices 35 are provided with conductors 36 and 37 arranged to lead to a switching apparatus similar to the switches 8 and 9 of Fig. 1, whereby the translating devices 35 may be connected to the supply circuit with either a star or a delta-connection to vary the load capacity in a manner similar to that used for varying the load capacity of the power transformer of Fig. 1.

Instead of changing the primary windings of a power transformer from star to delta-connection or vice versa for operation at different load capacities, as shown in Fig. 1, the primary connections may be made to different taps as shown in Fig. 3.

In Fig. 3, my invention is shown, by way of illustration, as applied to a three-phase supply circuit 1 controlled by an automatic circuit breaker 2 having a trip coil 3. In the supply circuit 1, there is a power transformer 4 having primary windings 5 and secondary windings 6. The secondary windings 6 are shown star connected to the load circuit 7 and the primary windings 5 are star connected and provided with taps 38, 39. To operate the power transformer 4 at reduced KV—A or load capacity, the switch 40 is closed, thus connecting the primary windings 5 to the supply circuit 1 by the conductors 27 and the taps 38 and for operation at full load capacity the switch 41 is closed, thus connecting the primary windings 5 to the supply circuit 1 by the conductors 31 and the taps 39. Upon closing the switch 40 the bridging members 21, 21′ interlocked thereto, short circuit the relay windings 14, 14′, and current flow through the relays 11, 11′ and the secondaries of the current transformers 15, 15′ is established as heretofore described, and similarly upon closing switch 41 the bridging members 20, 20′ interlocked thereto short circuit the relay windings 13, 13′, and current flow through the relays 12, 12′ and the secondaries of the current transformers 15, 15′ is established. Therefore, in operating the switches 40 and 41 of Fig. 3 to vary the load capacity of the power transformer 4, relays responsive to loads in excess of the predetermined amounts are selectively placed in circuit with the secondaries of the current transformers 15, 15' in accordance with the load connection established, to protect the power transformer by closing the trip coil circuit, thereby causing the trip coil 3 to open the circuit breaker 2 and thus interrupt the supply circuit 1 as heretofore described in connection with Fig. 1.

Although I have shown and described my invention in considerable detail, I do not wish to be limited to the specific details thereof, as shown and described, but may use such modifications in, substitutions for, or equivalents thereof, as are embraced within the scope of my invention.

What I claim as new and desire to secure by Letters Patent of the United States, is,—

1. In combination, a supply circuit, a load circuit, means for varying the load capacity of the load circuit, means for controlling the supply circuit, transforming means connected in the supply circuit, and protective means for operating the controlling means associated with the transforming means and controlled by the load capacity varying means.

2. In combination, a supply circuit, a load circuit, means for varying the load capacity of the load circuit, circuit controlling means in the supply circuit, transforming means connected in the supply circuit, and protective means associated with the transforming means and arranged to be controlled by the load capacity varying means, operative in response to abnormal circuit conditions to open the circuit controlling means.

3. In combination a three-phase supply circuit, power apparatus, circuit controlling means in said supply circuit, switching means adapted to be operated to connect said power apparatus to said supply circuit in either delta or star-connection, relays adapted to be connected to respond to the load in said supply circuit and arranged to control said circuit controlling means, and means arranged to be operated by said switching means for connecting one of said relays in circuit when the delta-connection is established and for connecting another relay in circuit when the star-connection is established.

4. The combination with a supply circuit and a transforming device arranged to be connected thereto for operation at different load capacities, of means for connecting said transforming device for said different load capacities, circuit controlling means in said supply circuit, and a plurality of relays selectively controlled by said connecting means and arranged to cause said circuit controlling means to open the supply circuit when the load exceeds that corresponding to the load capacity established by said connecting means.

5. In combination, a supply circuit, controlling means therein adapted to control the power supplied, a power transformer adapted to be connected to operate at different load capacities, load responsive relay means arranged to control said controlling means, and switching means arranged to vary the load capacity of said transformer and to vary the responsiveness of the relay means in accordance with the load capacity established by the switching means.

6. A protective system of the class described, comprising a supply circuit, a circuit controlling means therein, load apparatus, a plurality of relays adapted to control the operation of said circuit controlling means, and means adapted to be operated to connect said load apparatus to said supply circuit in a plurality of different ways in each of which the load capacity of the apparatus is different, characterized by the fact that means are provided for selectively rendering the relays operative in accordance with the circuit connection established.

7. In combination, a three-phase supply circuit, transforming apparatus, circuit controlling means in said supply circuit, an auxiliary circuit normally open, means in said auxiliary circuit for opening said circuit controlling means, a current transformer in said supply circuit, relays connected in series with said current transformer, and switching means arranged to connect the windings of said transforming apparatus to the supply circuit with either a star or a delta-connection and selectively, in accordance with the connection established, to complete shunt circuits around said relays whereby one or the other of the relays is rendered responsive to close the auxiliary circuit and interrupt the supply circuit upon the occurrence of a predetermined current in the supply circuit.

In witness whereof, I have hereunto set my hand this 29th day of November, 1920.

ALFRED C. FINNEY.